(12) United States Patent
Nomaru

(10) Patent No.: US 11,504,804 B2
(45) Date of Patent: Nov. 22, 2022

(54) METHOD OF CONFIRMING OPTICAL AXIS OF LASER PROCESSING APPARATUS

(71) Applicant: DISCO CORPORATION, Tokyo (JP)

(72) Inventor: Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 263 days.

(21) Appl. No.: 17/006,030

(22) Filed: Aug. 28, 2020

(65) Prior Publication Data

US 2021/0069826 A1 Mar. 11, 2021

(30) Foreign Application Priority Data

Sep. 5, 2019 (JP) .............................. JP2019-162457

(51) Int. Cl.
*B23K 26/06* (2014.01)
*B23K 26/082* (2014.01)
(Continued)

(52) U.S. Cl.
CPC ...... *B23K 26/0643* (2013.01); *B23K 26/0821* (2015.10); *B23K 26/705* (2015.10);
(Continued)

(58) Field of Classification Search
CPC .. B23K 26/0853; B23K 26/40; B23K 26/032; B23K 26/0622; B23K 26/082; B23K 26/389; B23K 26/04; B23K 26/046; B23K 26/0869; B23K 26/53; B23K 26/034; B23K 26/048; B23K 26/0626; B23K 26/0648; B23K 26/382; B23K 26/03; B23K 26/0643; B23K 26/067; B23K 26/0673; B23K 26/0861; B23K 26/0876; B23K 26/352; B23K 26/359; B23K 26/361; B23K 26/364; B23K 26/38; B23K 26/705; B23K 26/0006; B23K 26/042; B23K 26/043; B23K 26/044; B23K 26/06;
(Continued)

(56) References Cited

U.S. PATENT DOCUMENTS

| 7,332,415 | B2 * | 2/2008 | Nagai ................. H01L 21/3043 257/E21.599 |
| 2006/0119691 | A1 * | 6/2006 | Shigematsu ...... H01L 21/67253 347/131 |

(Continued)

FOREIGN PATENT DOCUMENTS

| JP | 2015085347 A | 5/2015 |
| JP | 2016068149 A | 5/2016 |

*Primary Examiner* — Chris Q Liu
(74) *Attorney, Agent, or Firm* — Greer Burns & Crain Ltd.

(57) ABSTRACT

A method of confirming an optical axis of a laser processing apparatus includes placing an image capturing unit so as to be movable in X-axis directions, removing a second mirror and capturing an image of a laser beam with the image capturing unit for receiving the laser beam reflected by a first mirror, installing the second mirror and capturing an image of the laser beam with the image capturing unit for receiving the laser beam reflected by a third mirror, and determining whether an optical axis of the laser beam reflected by the first mirror and an optical axis of the laser beam reflected by the third mirror exist in one XZ plane or not on the basis of the captured images and a reference line in the captured images.

4 Claims, 13 Drawing Sheets

(51) Int. Cl.
  *B23K 26/70*   (2014.01)
  *B23K 26/0622* (2014.01)
(52) U.S. Cl.
  CPC ...... *B23K 26/0622* (2015.10); *B23K 26/0648* (2013.01); *B23K 26/0665* (2013.01)
(58) Field of Classification Search
  CPC ............ B23K 26/0604; B23K 26/0613; B23K 26/0617; B23K 26/066; B23K 26/073; B23K 26/0823; B23K 26/083; B23K 26/16; B23K 26/355; B23K 26/362; B23K 26/402; B23K 26/707; B23K 26/009; B23K 26/02; B23K 26/035; B23K 26/0624; B23K 26/0652; B23K 26/0665; B23K 26/08; B23K 26/0884; B23K 26/123; B23K 26/127; B23K 26/14; B23K 26/21; B23K 26/28; B23K 26/323; B23K 26/34; B23K 26/356; B23K 26/384; B23K 26/386; B23K 26/388; B23K 26/57; B23K 26/60; H01L 21/67092; H01L 21/78; H01L 21/268; H01L 21/3043; H01L 21/324; H01L 21/67115; H01L 21/76898; H01L 21/02057; H01L 21/30; H01L 21/304; H01L 21/3221; H01L 21/486; H01L 21/67248; H01L 21/67253; H01L 21/67294; H01L 21/682; H01L 21/768; H01L 21/76802; H01L 21/77; G02B 21/0032; G02B 21/0016; G02B 21/004; G02B 21/0052; G02B 21/0076; G02B 21/0092; G02B 21/24; G02B 21/245; G02B 21/361

USPC ............ 219/121.67, 121.62, 121.61, 121.68, 219/121.69, 121.81, 121.71, 121.8, 219/121.83, 121.85, 121.64, 121.65, 219/121.7, 121.72, 121.73, 121.76, 219/121.78, 121.82

See application file for complete search history.

(56) References Cited

U.S. PATENT DOCUMENTS

| | | | |
|---|---|---|---|
| 2007/0119835 A1* | 5/2007 | Nomaru ................. | B23K 26/53 219/121.73 |
| 2008/0011722 A1* | 1/2008 | Kobayashi ......... | B23K 26/0853 219/121.62 |
| 2008/0011723 A1* | 1/2008 | Morikazu .............. | B23K 26/16 219/121.68 |
| 2008/0055588 A1* | 3/2008 | Nomaru ............... | B23K 26/034 356/73 |
| 2008/0067157 A1* | 3/2008 | Morikazu ............ | B23K 26/389 257/E21.597 |
| 2009/0275929 A1* | 11/2009 | Zickler ............... | A61F 9/00804 606/4 |
| 2010/0140236 A1* | 6/2010 | Cai ........................ | B23K 26/03 219/121.72 |
| 2014/0256161 A1* | 9/2014 | Li ........................ | B23K 26/352 438/795 |
| 2016/0114434 A1* | 4/2016 | Regaard ................ | B23K 26/707 219/121.81 |
| 2016/0151857 A1* | 6/2016 | Odagiri ................ | B23K 26/035 219/121.81 |
| 2018/0264600 A1* | 9/2018 | Sugino ................. | B23K 31/125 |

* cited by examiner

METHOD OF CONFIRMING OPTICAL AXIS OF LASER PROCESSING APPARATUS

BACKGROUND OF THE INVENTION

Field of the Invention

The present invention relates to a method of confirming an optical axis of a laser processing apparatus.

Description of the Related Art

Laser processing apparatuses for processing a workpiece with a laser beam are arranged such that the laser beam that is emitted from a laser oscillator is propagated to a processing point by a plurality of optical devices and focused by a condensing lens to process the workpiece (see, for example, JP2015-085347A and JP2016-68149A).

SUMMARY OF THE INVENTION

However, laser processing apparatuses having a complex optical system are problematic in that it is very difficult and time-consuming to adjust the optical axis of a laser beam. For example, if the laser beam is applied slantwise to the workpiece, then the workpiece may possibly be processed with defects, e.g., the workpiece may be processed obliquely or the opposite sides of a groove defined in the workpiece by the laser beam may be differently processed. Consequently, the conventional laser processing apparatuses are required to adjust the optical axis of the laser beam such that the laser beam will be applied perpendicularly to the workpiece.

Furthermore, laser processing apparatuses having a polygon mirror for scanning a laser beam in a processing-in-progress direction, i.e., an X-axis direction, to process a workpiece with the laser beam, as disclosed in JP2015-085347A and JP2016-68149A, are also required for the optical axis of the laser beam applied to the polygon mirror to be parallel to the X-axis direction.

In addition, the laser processing apparatuses are required to have the optical axis of a laser beam reflected along vertical directions from a plurality of optical devices such as a polygon mirror, existing in one plane parallel to a processing-in-progress direction.

It is currently a general practice to confirm a returning beam using a mirror that reflects the laser beam as a method of confirming a tilt or the like of the optical axis of the laser beam. However, the method is problematic in that the criterion for confirming the tilt of the laser beam is indefinite as the confirmation is based on eye measurement.

It is therefore an object of the present invention to provide a method of confirming an optical axis of a laser processing apparatus which makes it possible to quantitatively assess whether optical axes of laser beams reflected along vertical directions from a plurality of optical devices exist in one plane parallel to a processing-in-progress direction or not.

In accordance with an aspect of the present invention, there is provided a method of confirming an optical axis of a laser processing apparatus. The laser processing apparatus includes a chuck table for holding a workpiece thereon, a laser beam applying unit for processing the workpiece held on the chuck table by applying a laser beam thereto, and a moving assembly for moving the chuck table and the laser beam applying unit relatively to each other in X-axis directions and Y-axis directions perpendicular to the X-axis directions. The laser beam applying unit includes a first optical device having a line of intersection with an XZ plane perpendicular to an XY plane lying parallel to the X-axis directions and the Y-axis directions, for reflecting the laser beam into a direction parallel to the XZ plane, a laser oscillator disposed for emitting the laser beam so as to intersect with the line of intersection, a second optical device for reflecting the laser beam reflected by the first optical device to change a traveling direction of the laser beam within the XZ plane, and a third optical device for reflecting the laser beam whose traveling direction has been changed by the second optical device into a direction parallel to the XZ plane. The method includes an image capturing unit placing step of placing an image capturing unit for capturing an image of the laser beam so as to be movable in the X-axis directions, a first image capturing step of removing the second optical device, positioning the image capturing unit in a first position for receiving the laser beam reflected by the first optical device, and capturing an image of the laser beam emitted from the laser oscillator with the image capturing unit, a second image capturing step of installing the second optical device, positioning the image capturing unit in a second position for receiving the laser beam reflected by the third optical device, and capturing an image of the laser beam emitted from the laser oscillator with the image capturing unit, and a determining step of determining whether an optical axis of the laser beam reflected by the first optical device and an optical axis of the laser beam reflected by the third optical device exist in one XZ plane or not on the basis of an amount of a shift between a reference line parallel to the X-axis directions in the captured images and positions of the laser beams in the images captured in the first image capturing step and the second image capturing step.

Preferably, in a case in which it is determined in the determining step that the optical axis of the laser beam reflected by the first optical device and the optical axis of the laser beam reflected by the third optical device do not exist in one XZ plane, at least either positions or tilts of the second optical device and the third optical device are adjusted so as to position the optical axes in one XZ plane.

Preferably, the third optical device includes a polygon mirror.

Preferably, the method further includes a detecting step for detecting a tilt of the polygon mirror on the basis of whether a straight line interconnecting the position of the laser beam at the time of starting to scan and the position of the laser beam at the time of ending to scan in the images captured by the image capturing unit is parallel to the reference line in the captured images.

The present invention is advantageous in that it is able to quantitatively assess whether optical axes of laser beams reflected along vertical directions from a plurality of optical devices exist on one plane parallel to a processing-in-progress direction or not.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Preferred embodiments of the present invention will hereinafter be described in detail below with reference to the drawings. The present invention is not limited to the details of the embodiments described below. The components described below cover those which could easily be anticipated by those skilled in the art and those which are essentially identical thereto. Furthermore, the arrangements described below can be used in appropriate combinations. Various omissions, replacements, or changes of the arrangements may be made without departing from the scope of the present invention.

First Embodiment

Figure 1:
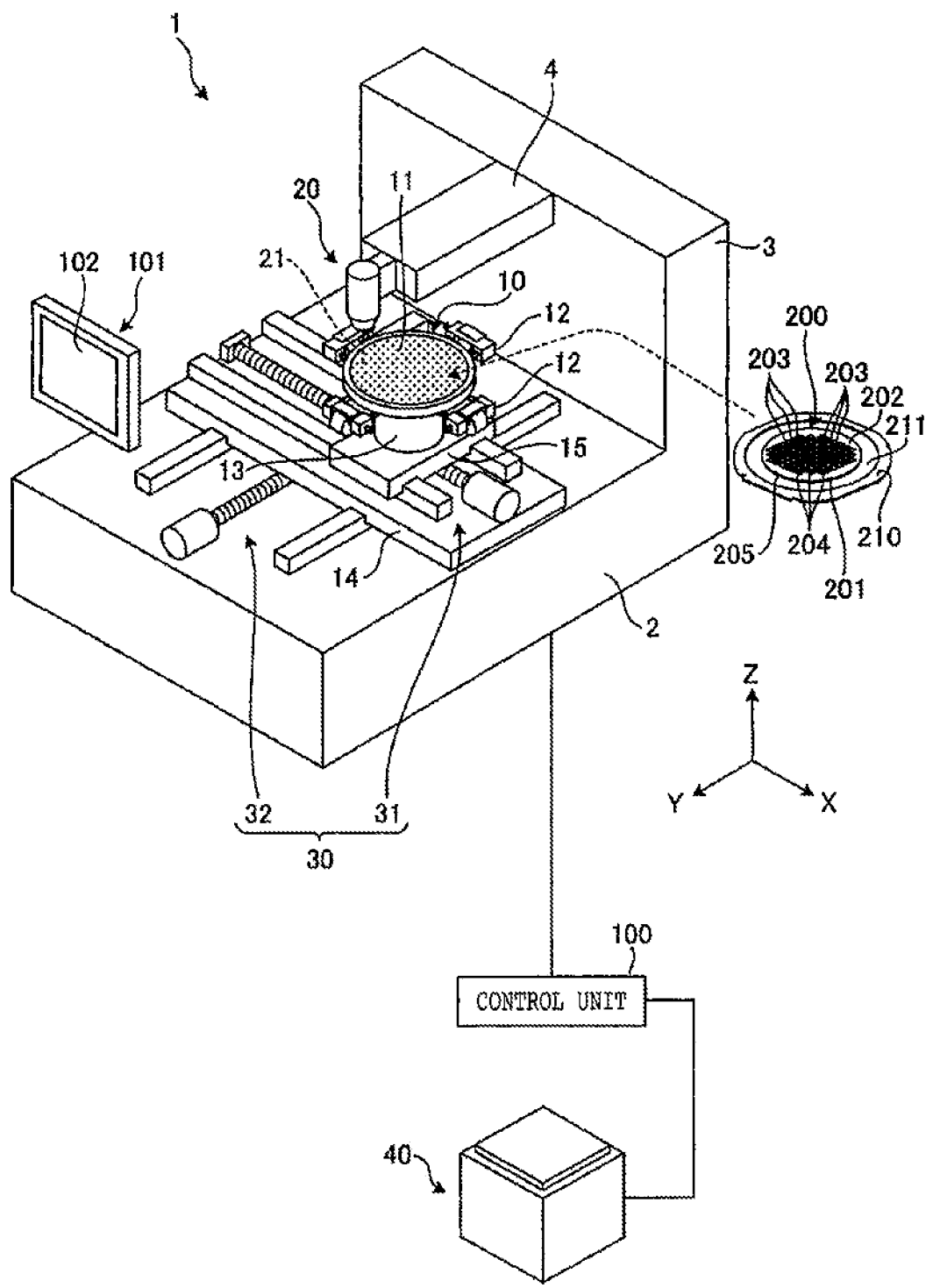
FIG. 1 is a perspective view illustrating a structural example of a laser processing apparatus that carries out a method of confirming an optical axis of a laser processing apparatus according to a first embodiment of the present invention.
Figure 2:
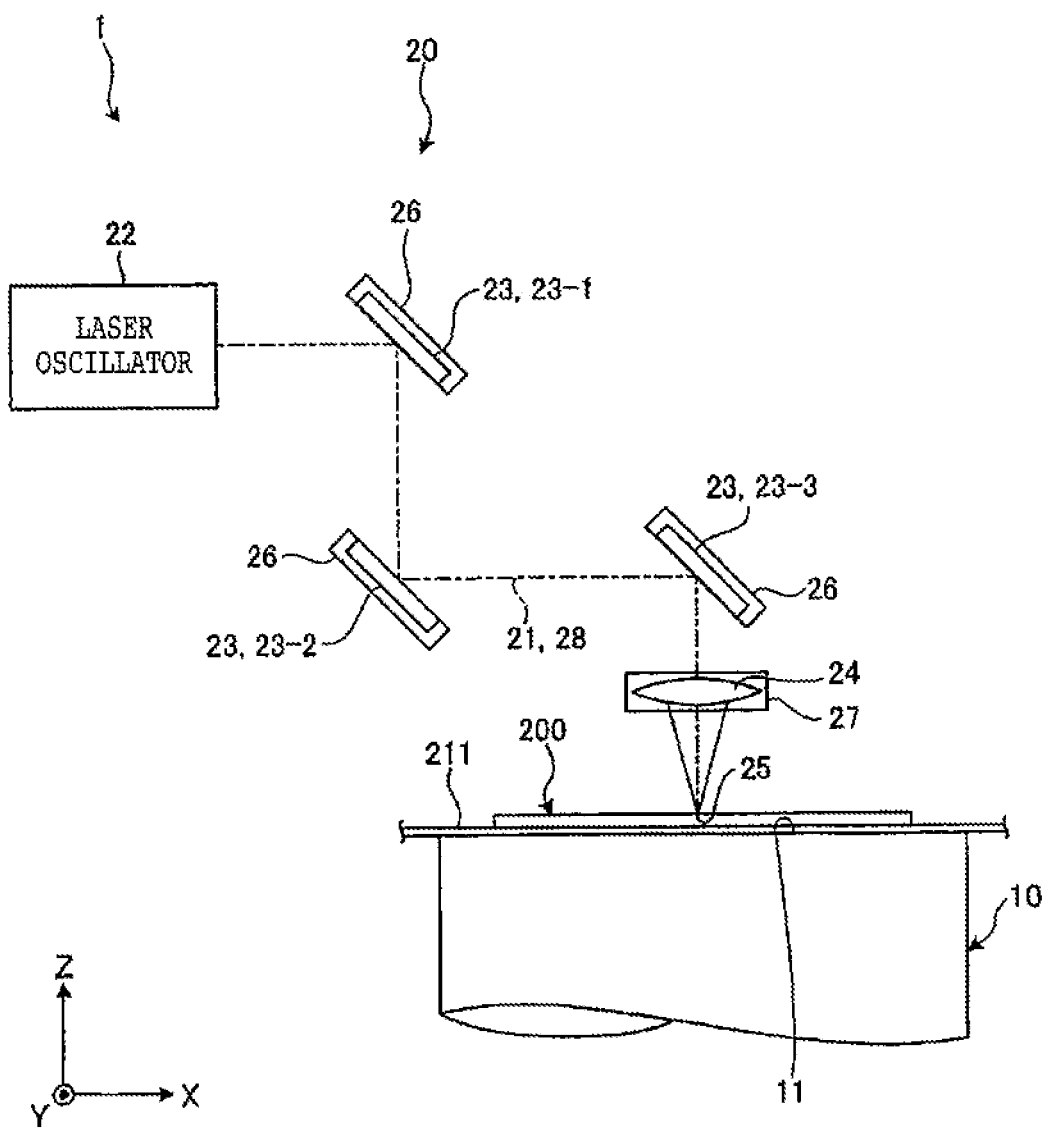
FIG. 2 is a schematic view illustrating a make-up of a laser beam applying unit of the laser processing apparatus illustrated in FIG. 1.
Figure 3:
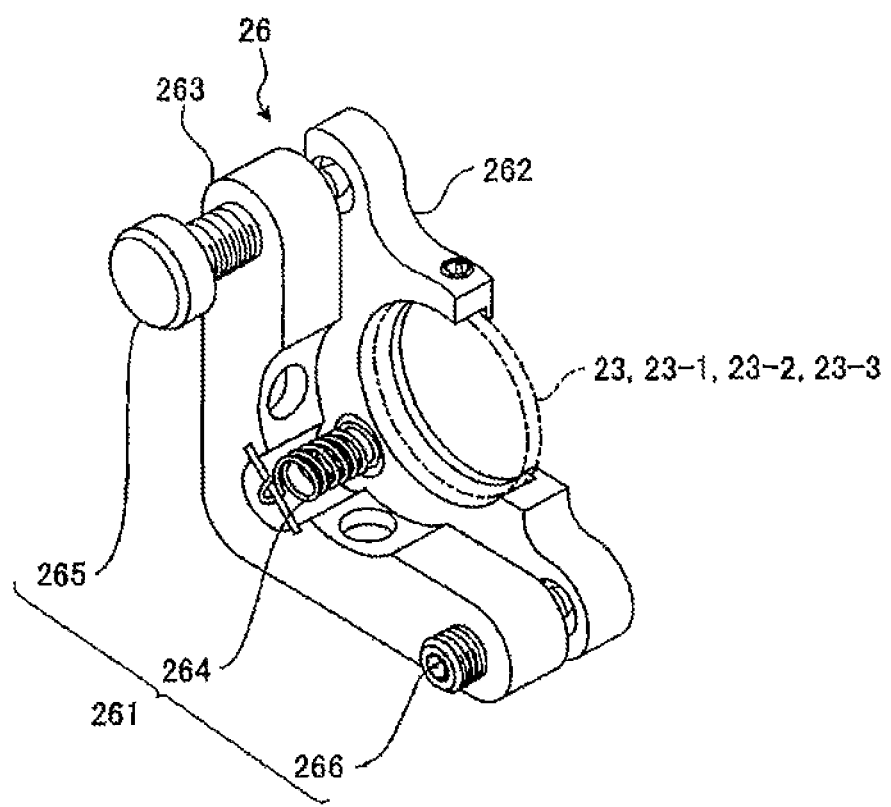
FIG. 3 is a perspective view illustrating a structure of a mirror holder of the laser beam applying unit illustrated in FIG. 2.
Figure 4:
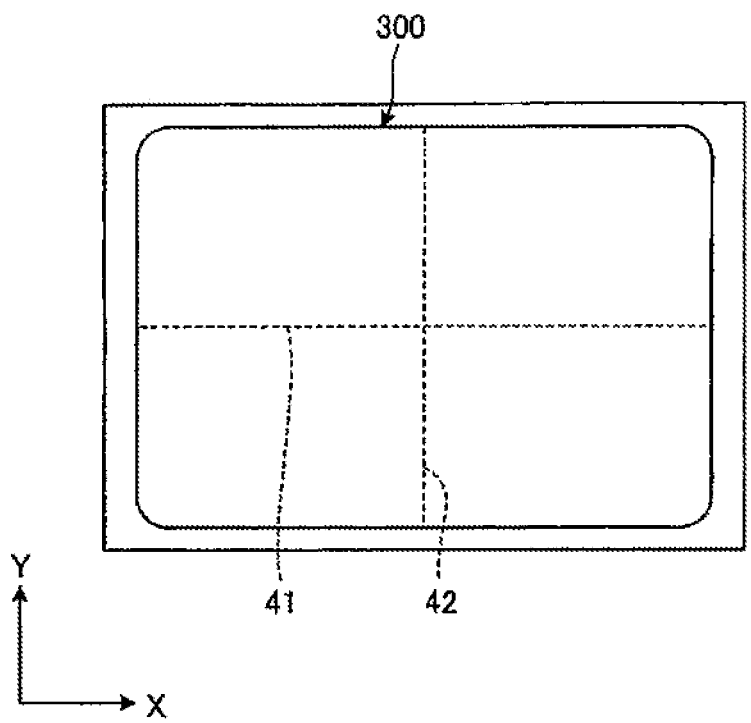
FIG. 4 is a view illustrating by way of example an image captured by an image capturing unit connected to a control unit of the laser processing apparatus illustrated in FIG. 1.
Figure 5:
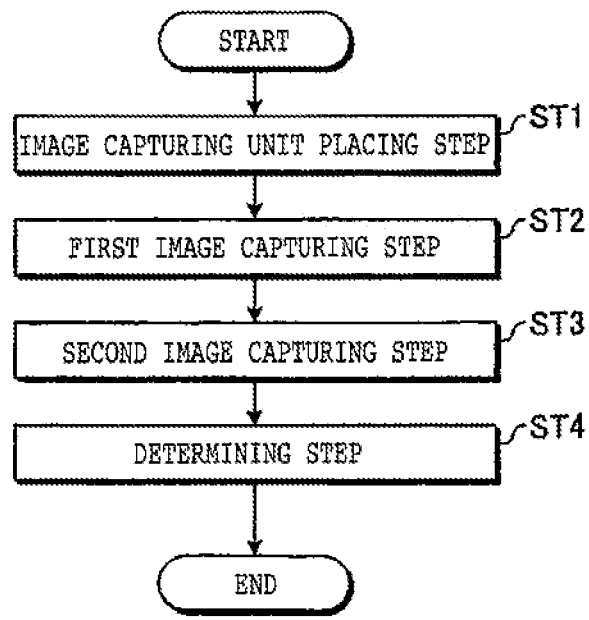
FIG. 5 is a flowchart of a sequence of the method of confirming the optical axis of a laser processing apparatus according to the first embodiment.

A method of confirming an optical axis of a laser processing apparatus according to a first embodiment of the present invention will be described below with reference to the drawings. FIG. 1 illustrates in perspective a structural example of a laser processing apparatus that carries out a method of confirming an optical axis of a laser processing apparatus according to the first embodiment. FIG. 2 schematically illustrates a make-up of a laser beam applying unit of the laser processing apparatus illustrated in FIG. 1. FIG. 3 illustrates in perspective a structure of a mirror holder of the laser beam applying unit illustrated in FIG. 2. FIG. 4 illustrates by way of example an image captured by an image capturing unit connected to a control unit of the laser processing apparatus illustrated in FIG. 1. FIG. 5 is a flowchart of a sequence of the method of confirming the optical axis of a laser processing apparatus according to the first embodiment.

The method of confirming the optical axis of a laser processing apparatus (hereinafter also referred to as "optical axis confirming method") according to the first embodiment is carried out by the laser processing apparatus, denoted by 1, illustrated in FIG. 1. The laser processing apparatus 1 illustrated in FIG. 1 is an apparatus for processing a workpiece 200 by applying a pulsed laser beam 21 to the workpiece 200.

The workpiece 200 as a target to be processed by the laser processing apparatus 1 illustrated in FIG. 1 is a wafer such as a disk-shaped semiconductor wafer, optical device wafer, or the like having a substrate 201 made of silicon, sapphire, gallium arsenide, or the like. As illustrated in FIG. 1, the workpiece 200 has a grid of projected dicing lines 203 established on a face side 202 of the substrate 201 and a plurality of devices 204 disposed in respective areas demarcated on the face side 202 by the projected dicing lines 203. The devices 204 may be integrated circuits (ICs), large-scale integration (LSI) circuits, or image sensors such as charge-coupled devices (CCDs) or complementary metal oxide semiconductor (CMOS) image sensors.

According to the first embodiment, the workpiece 200 has its reverse side 205, opposite the face side 202, affixed to an adhesive tape 211 in the form of a circular sheet that is larger in diameter than the workpiece 200 and has an outer circumferential edge portion affixed to an annular frame 210. Therefore, the workpiece 200 is supported in the opening of the annular frame 210 by the adhesive tape 211. According to the first embodiment, the workpiece 200 will be divided along the projected dicing lines 203 into individual device chips having the respective devices 204.

(Laser Processing Apparatus)

As illustrated in FIG. 1, the laser processing apparatus 1 includes a chuck table 10 for holding the workpiece 200 on a holding surface 11 thereof, a laser beam applying unit 20, a moving assembly 30, and a control unit 100.

The chuck table 10 holds the workpiece 200 on the holding surface 11. The holding surface 11 is of a disk shape made of porous ceramics or the like and is connected to a vacuum suction source, not illustrated, through a vacuum suction passageway, not illustrated. The chuck table 10 holds the workpiece 200 under suction that is placed on the holding surface 11. According to the first embodiment, the holding surface 11 is a flat surface lying parallel to horizontal directions. A plurality of clamps 12 for gripping and clamping the annular frame 210 that supports the workpiece 200 in its opening are disposed around the chuck table 10. The chuck table 10 is rotatable about its own central axis parallel to Z-axis directions by a rotary unit 13. The Z-axis directions extend perpendicularly to the holding surface 11 and parallel to vertical directions. The rotary unit 13 and the chuck table 10 are movable in X-axis directions, extending perpendicularly to the Z-axis directions, by an X-axis moving unit 31, to be described later, of the moving assembly 30.

The laser beam applying unit 20 is a unit for processing the workpiece 200 held on the chuck table 10 by applying a pulsed laser beam 21 to the workpiece 200. According to the first embodiment, as illustrated in FIG. 1, the laser beam applying unit 20 has a portion supported on a distal end of a support beam 4 that is attached at its proximal end to an upstanding wall 3 mounted on an apparatus base 2.

As illustrated in FIG. 2, the laser beam applying unit 20 includes a laser oscillator 22 for emitting the laser beam 21 for processing the workpiece 200, a plurality of mirrors 23 for reflecting and propagating the laser beam 21 emitted from the laser oscillator 22 toward the workpiece 200 held on the holding surface 11 of the chuck table 10, a condensing lens 24 for focusing the laser beam 21 propagated by the mirrors 23 onto the workpiece 200, and focused spot position adjusting means, not illustrated, for displacing a focused spot 25 of the laser beam 21 along the Z-axis directions.

The laser beam 21 that is applied from the laser beam applying unit 20 to the workpiece 200 may have a wavelength that can be transmitted through the workpiece 200 or a wavelength that can be absorbed by the workpiece 200.

According to the first embodiment, the laser beam applying unit 20 has three mirrors 23. Of the three mirrors 23, the mirror 23 that is positioned most upstream in its traveling direction (hereinafter referred to as "first mirror 23-1") is a first optical device for reflecting the laser beam 21 emitted from the laser oscillator 22 into a direction parallel to an XZ plane that lies perpendicularly to an XY plane. The XY plane lies parallel to both the X-axis directions and Y-axis directions that extend parallel to horizontal directions and are perpendicular to each other. The XZ plane lies parallel to both the X-axis directions and the Z-axis directions. According to the first embodiment, the first mirror 23-1 reflects the laser beam 21 emitted from the laser oscillator 22 downwardly along one of the Z-axis directions. Therefore, the laser beam 21 is reflected downwardly along a vertical direction from the first mirror 23-1. Since the first mirror 23-1 reflects the laser beam 21 into a direction parallel to the XZ plane, the first mirror 23-1 intersects with the XZ plane along a line, i.e., has a line of intersection with the XZ plane. Furthermore, since the first mirror 23-1 reflects the laser bream 21 into a direction parallel to the XZ plane, the laser oscillator 22 emits the laser beam 21 that intersects with the line of intersection of the first mirror 23-1.

Of the three mirrors 23, the mirror 23 that is positioned centrally in its traveling direction (hereinafter referred to as "second mirror 23-2") is a second optical device for reflecting the laser beam 21 reflected by the first mirror 23-1 to change the traveling direction of the laser beam 21 within the XZ plane. According to the first embodiment, the second mirror 23-2 reflects the laser beam 21 reflected by the first mirror 23-1 into a direction parallel to the XY plane.

Of the three mirrors 23, the mirror 23 that is positioned most downstream in its traveling direction (hereinafter referred to as "third mirror 23-3") is a third optical device for reflecting the laser beam 21 whose traveling direction has been changed by the second mirror 23-2 into a direction parallel to the XZ plane. According to the first embodiment, the third mirror 23-3 reflects the laser beam 21 whose traveling direction has been changed by the second mirror 23-2 along one of the Z-axis directions toward the condensing lens 24 below the third mirror 23-3. The laser beam 21 is thus reflected downwardly along a vertical direction from the third mirror 23-3.

The mirrors 23-1, 23-2, and 23-3 and the condensing lens 24 are optical devices for propagating the laser beam 21 emitted from the laser oscillator 22 onto a processing point where the laser beam 21 processes the workpiece 200. The laser beam applying unit 20 also includes a plurality of mirror holders 26 as optical device holders that hold the respective mirrors 23-1, 23-2, and 23-3, and a lens holder 27 as an optical device holder that holds the condensing lens 24. The mirror holders 26 and the lens holder 27 have respective adjusting mechanisms 261 (see FIG. 3) for adjusting an optical axis 28 (indicated by a dot-and-dash line in FIG. 2) of the laser beam 21. The mirror holders 26 and the lens holder 27 are of essentially identical structures, and the adjusting mechanisms 261 of the mirror holders 26 and the lens holder 27 have essentially identical functions. One of the mirror holders 26 will be described below with reference to FIG. 3, and the description of the lens holder 27 will be omitted below. According to the first embodiment, the adjusting mechanisms 261 have essentially identical functions, as described above. According to the present invention, however, the mirror holders 26 may have a tilt adjusting function and the lens holder 27 may be free of a tilt adjusting function and have only an X-/Y-axis moving function.

According to the first embodiment, as illustrated in FIG. 3, the mirror holder 26 includes a first plate 262 that holds the mirror 23, a second plate 263 fixed to the laser processing apparatus 1, and an adjusting mechanism 261. The first plate 262 and the second plate 263 are L-shaped. The first plate 262 holds the mirror 23 in its central region.

The adjusting mechanism 261 includes a spring 264 interconnecting the first plate 262 and the second plate 263 and normally biasing the first plate 262 and the second plate 263 to move toward each other, and a pair of adjusting screws 265 and 266. According to the present embodiment, the spring 264 interconnects respective central regions of the first plate 262 and the second plate 263. The adjusting screws 265 and 266 are threaded through respective both ends of the second plate 263 and have respective tip ends abutting against both end portions of the first plate 262. When the adjusting screws 265 and 266 are turned about their own axes, distances between the both ends of the first and second plates 262 and 263 are adjusted to adjust at least one of a position and a tilt of the mirror 23.

According to the first embodiment, the mirrors 23, i.e., 23-1, 23-2, and 23-3 and the condensing lens 24 are illustrated as optical devices. According to the present invention, however, optical devices are not limited to the mirrors 23 and the condensing lens 24. According to the first embodiment, the mirror holders 26 and the lens holder 27 are illustrated as optical device holders. According to the present invention, however, optical device holders are not limited to the mirror holders 26 and the lens holder 27. According to the present invention, furthermore, the structures of the mirror holders 26 and the lens holder 27 as optical device holders are not limited to the structures illustrated in the first embodiment.

According to the first embodiment, the laser beam 21 applied from the laser beam applying unit 20 to the workpiece 200 has a circular cross-sectional shape in a plane perpendicular to the optical axis 28. According to the present invention, the cross-sectional shape of the laser beam 21 is not limited to a circular cross-sectional shape.

The moving assembly 30 moves the chuck table 10 and the laser beam applying unit 20 relatively to each other in the X-axis directions and Y-axis directions perpendicular to the X-axis directions. The X-axis directions and the Y-axis directions extend parallel to the holding surface 11. The moving assembly 30 includes the X-axis moving unit 31 as processing feed means for moving the chuck table 10 in the X-axis directions and a Y-axis moving unit 32 as indexing feed means for moving the chuck table 10 in the Y-axis directions.

According to the first embodiment, the Y-axis moving unit 32 is mounted on the apparatus base 2 of the laser processing apparatus 1. The Y-axis moving unit 32 supports a moving plate 14 so as to be movable in the Y-axis directions thereon, the moving plate 14 supporting the X-axis moving unit 31 thereon. The X-axis moving unit 31 is mounted on the moving plate 14. The X-axis moving unit 31 supports a second moving plate 15 so as to be movable in the X-axis directions thereon, the second moving plate 15 supporting the rotary unit 13 for rotating the chuck table 10 about a central axis parallel to the Z-axis directions.

The X-axis moving unit 31 and the Y-axis moving unit 32 include respective known ball screws rotatable about their own central axes, respective known stepping motors for rotating the respective ball screws about their own central axes, and respective pairs of known guide rails that support the respective moving plates 14 and 15 so as to be movable in the X-axis directions and the Y-axis directions, respectively, thereon.

The laser processing apparatus 1 further includes an X-axis direction position detecting unit, not illustrated, for detecting a position of the chuck table 10 in the X-axis directions and a Y-axis direction position detecting unit, not illustrated, for detecting the position of the chuck table 10 in the Y-axis directions. The X-axis direction position detecting unit and the Y-axis direction position detecting unit output detected positions to the control unit 100.

The control unit 100 controls the components described above of the laser processing apparatus 1 to enable the laser processing apparatus 1 to process the workpiece 200. The control unit 100 is a computer including an arithmetic processing apparatus having a microprocessor such as a central processing unit (CPU), a storage apparatus having a memory such as a read only memory (ROM) or a random access memory (RAM), and an input/output interface apparatus. The arithmetic processing apparatus of the control unit 100 performs various arithmetic processing operations according to computer programs stored in the storage apparatus, and generates and outputs various control signals for controlling the laser processing apparatus 1 through the input/output interface apparatus to the above components of the laser processing apparatus 1, thereby realizing functions of the control unit 100.

The laser processing apparatus 1 also includes a display unit 101 such as a liquid crystal display apparatus for displaying states of processing operations and images, and an input unit, not illustrated, to be used by an operator of the laser processing apparatus 1 to register processing detail information, etc. The display unit 101 and the input unit are electrically connected to the control unit 100. The input unit includes at least one of a touch panel included in the display unit 101 and an external input apparatus such as a keyboard. The display unit 101 includes a display screen 102 for displaying information and images that can be changed by operator's actions entered through the input unit or the like.

As illustrated in FIG. 1, the control unit 100 can be connected to an image capturing unit 40. The image capturing unit 40 includes an image capturing device, not illustrated, for receiving the laser beam 21 from the laser oscillator 22. The image capturing device may be a CCD imaging device, a CMOS imaging device, or the like for capturing an image of the laser beam 21.

According to the first embodiment, the image capturing unit 40 is placed on the holding surface 11. The image capturing device of the image capturing unit 40 on the holding surface 11 captures an image of the laser beam 21 emitted from the laser oscillator 22 and propagated to the holding surface 11. The image captured by the image capturing device is referred to as a captured image 300 illustrated by way of example in FIG. 4. The image capturing unit 40 captures the image 300 within a predetermined field of vision, acquires the image 300 within the predetermined field of vision, and outputs the acquired captured image 300 to the control unit 100. The control unit 100 outputs the captured image 300 to the display unit 101. The display unit 101 displays the captured image 300 input from the control unit 100 on the display screen 102. In this manner, the image capturing unit 40 is able to capture an image of the laser beam 21.

The captured image 300 that has been captured and acquired by the image capturing unit 40 has a first reference line 41 and a second reference line 42 established therein that extend perpendicularly to each other. According to the first embodiment, the first reference line 41 and the second reference line 42 intersect perpendicularly with each other at the center of the captured image 300. When the image capturing unit 40 is placed on the holding surface 11, the first reference line 41 extends parallel to the X-axis directions.

Prior to a processing operation for processing the workpiece 200, the adjusting mechanisms 261 of the holders 26 and 27 are operated to adjust the optical axis 28 of the laser beam 21 in advance. The operator registers processing detail information in the control unit 100 through the input unit. The operator places the workpiece 200 on the holding surface 11 of the chuck table 10 with the adhesive tape 211 interposed therebetween. When the control unit 100 receives a processing operation start command from the operator through the input unit, the laser processing apparatus 1 starts the processing operation on the workpiece 200 on the basis of the registered processing detail information.

In the processing operation, the workpiece 200 is held under suction on the holding surface 11 of the chuck table 10 with the adhesive tape 211 interposed therebetween, and the annular frame 210 is clamped in position by the clamps 12. On the basis of the processing detail information, the moving assembly 30 moves the laser beam applying unit 20 and the workpiece 200 relatively to each other along one of the projected dicing lines 203, and the laser beam applying unit 20 applies the pulsed laser beam 21 to the workpiece 200, thereby processing the workpiece 200 along the projected dicing line 203 with the laser beam 21. After having processed the workpiece 200 along all the projected dicing lines 203 with the laser beam 21, the laser processing apparatus 1 stops applying the laser beam 21 from the laser beam applying unit 20 to the workpiece 200, finishing the processing operation. When the laser processing apparatus 1 starts up, suffers an operation error, or does not achieve a desired processed result, the optical axis 28 of the laser beam 21 is confirmed and adjusted.

(Method of Confirming the Optical Axis of a Laser Processing Apparatus)

The method of confirming the optical axis of a laser processing apparatus according to the first embodiment refers to a method of confirming the optical axis 28 of the laser beam 21 in the laser processing apparatus 1 described above. As illustrated in FIG. 5, the method of confirming the optical axis 28 of the laser beam 21 in the laser processing apparatus 1 includes an image capturing unit placing step ST1, a first image capturing step ST2, a second image capturing step ST3, and a determining step ST4. Before the method of confirming the optical axis of a laser processing apparatus according to the first embodiment is carried out, the optical axis 28 of the laser beam 21 reflected toward the chuck table 10 by the first mirror 23-1 has been adjusted parallel to the Z-axis directions, and the optical axis 28 of the laser beam 21 reflected toward the chuck table 10 by the third mirror 23-3 has been adjusted parallel to the Z-axis directions.

(Image Capturing Unit Placing Step)

The image capturing unit placing step ST1 is a step of placing the image capturing unit 40 so as to be movable in the X-axis directions. According to the first embodiment, in the image capturing unit placing step ST1, the image capturing unit 40 is prepared, the image capturing unit 40 is electrically connected to the control unit 100, the image capturing unit 40 is put in a predetermined position on the holding surface 11, and the image capturing unit 40 is placed so as to be movable in the X-axis directions. According to the first embodiment, the predetermined position on the holding surface 11 is a central position on the holding surface 11. However, according to the present invention, the predetermined position on the holding surface 11 is not limited to the central position on the holding surface 11. After the image capturing unit 40 has been placed in the predetermined position on the holding surface 11, control goes to the first image capturing step ST2.

(First Image Capturing Step)

Figure 6:
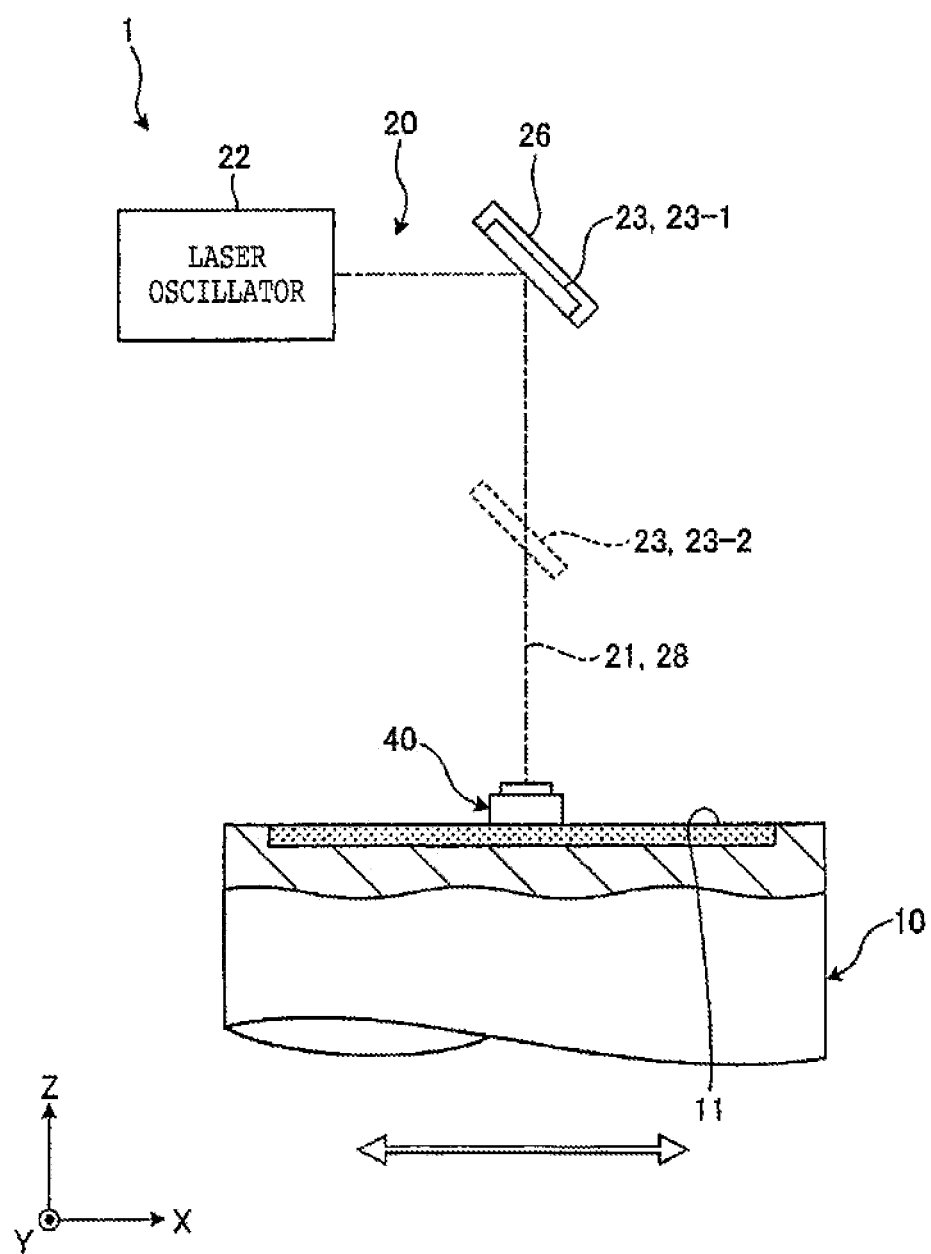
FIG. 6 is a schematic side elevational view, partly in cross section, illustrating a first image capturing step of the method of confirming the optical axis of a laser processing apparatus illustrated in FIG. 5.
Figure 7:
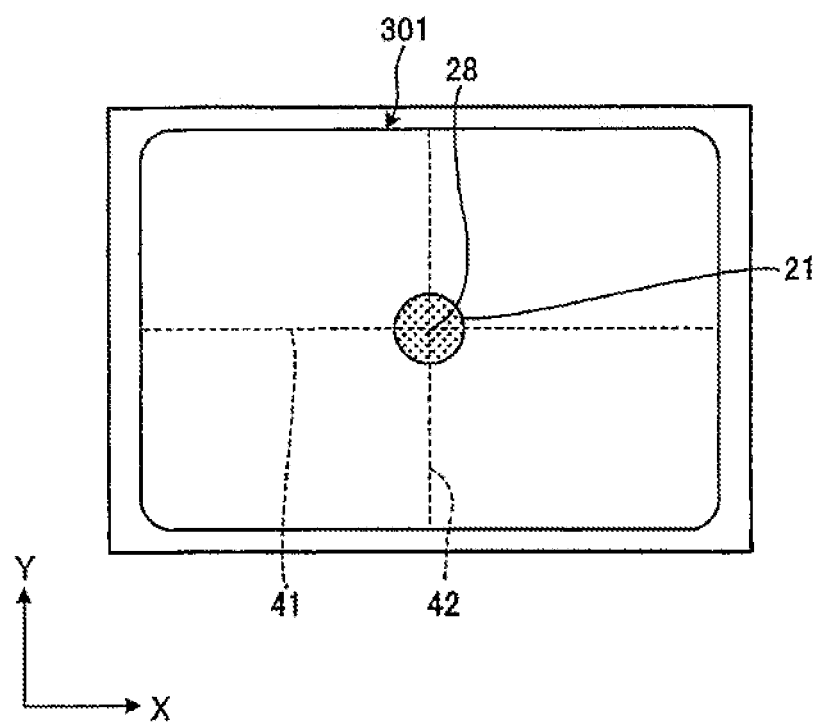
FIG. 7 is a view illustrating an example of an image captured in the first image capturing step of the method of confirming the optical axis of a laser processing apparatus illustrated in FIG. 5.

FIG. 6 schematically illustrates in side elevation, partly in cross section, a first image capturing step of the method of confirming the optical axis of a laser processing apparatus illustrated in FIG. 5. FIG. 7 illustrates an example of an image captured in the first image capturing step of the method of confirming the optical axis of a laser processing apparatus illustrated in FIG. 5.

The first image capturing step ST2 is a step of removing the second mirror 23-2 from the laser beam applying unit 20, positioning the image capturing unit 40 in a first position for receiving the laser beam 21 reflected by the first mirror 23-1, and energizing the laser oscillator 22 to emit the laser beam 21 for the image capturing unit 40 to capture an image of the laser beam 21.

In the first image capturing step ST2, the operator removes the second mirror 23-2 from the laser beam applying unit 20. In the first image capturing step ST2, in response to an operator's action entered through the input unit, the laser processing apparatus 1 adjusts the positions of the chuck table 10 in the X-axis directions and the Y-axis directions with the moving assembly 30 to cause the image capturing unit 40 on the holding surface 11 of the chuck table 10 to face the first mirror 23-1 of the laser beam applying unit 20 in the Z-axis directions.

In the first image capturing step ST2, in response to an operator's action entered through the input unit, the laser processing apparatus 1 adjusts an orientation of the chuck table 10 about its central axis with the rotary unit 13 to make the first reference line 41 of the captured image 300 from the image capturing unit 40 on the holding surface 11 parallel to the X-axis directions. According to the first embodiment, a point of intersection between the first reference line 41 and the second reference line 42 of the captured image 300 from the image capturing unit 40 on the holding surface 11 is positioned vertically downwardly of the first mirror 23-1. In the first image capturing step ST2, therefore, the image capturing unit 40 is positioned in the first position below the first mirror 23-1.

In the first image capturing step ST2, as illustrated in FIG. 6, the laser oscillator 22 emits the laser beam 21 that is reflected toward the chuck table 10 by the first mirror 23-1, and the image capturing unit 40 receives the laser beam 21, acquires a captured image 301 illustrated by way of example in FIG. 7 that includes a beam spot of the laser beam 21, and outputs the captured image 301 to the control unit 100. In the first image capturing step ST2, the control unit 100 extracts a position of the laser beam 21 from the captured image 301, calculates and stores coordinates of the laser beam 21 in the X-axis directions and the Y-axis directions in the captured image 301, and outputs the captured image 301 to the display unit 101. Then, control goes to the second image capturing step ST3. The display unit 101 displays the captured image 301 input thereto on the display screen 102.

(Second Image Capturing Step)

Figure 8:
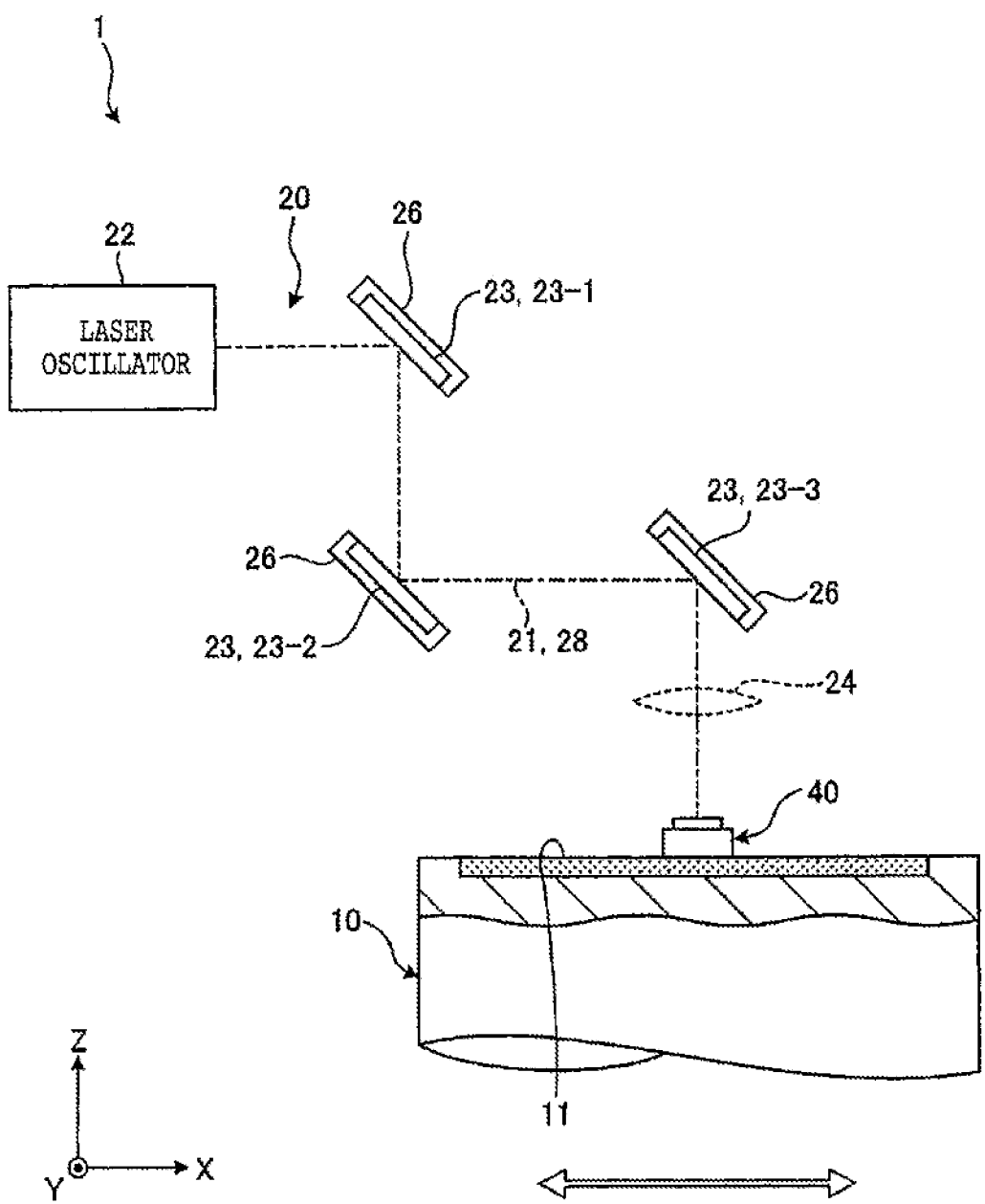
FIG. 8 is a schematic side elevational view, partly in cross section, illustrating a second image capturing step of the method of confirming the optical axis of a laser processing apparatus illustrated in FIG. 5.
Figure 9:
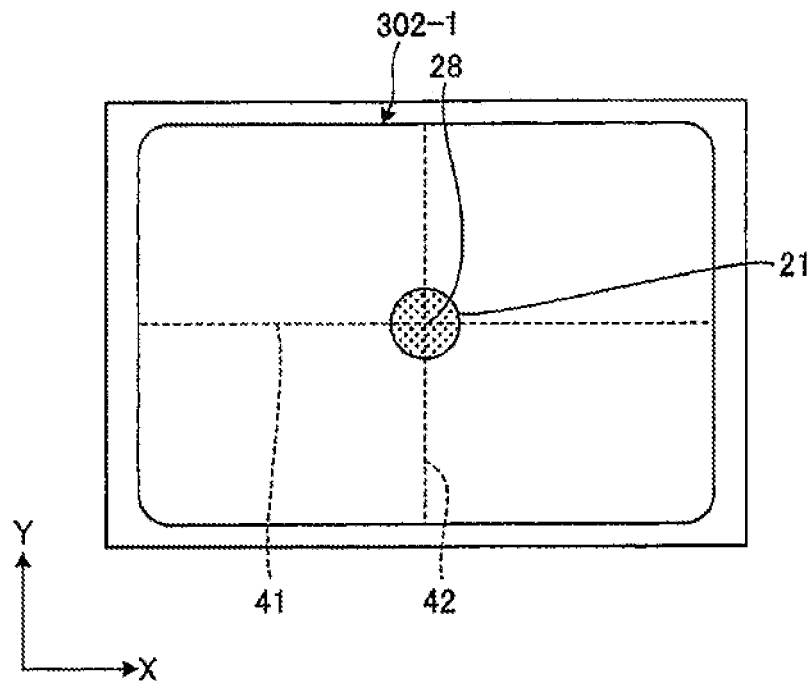
FIG. 9 is a view illustrating an example of an image captured in the second image capturing step of the method of confirming the optical axis of a laser processing apparatus illustrated in FIG. 5.
Figure 10:
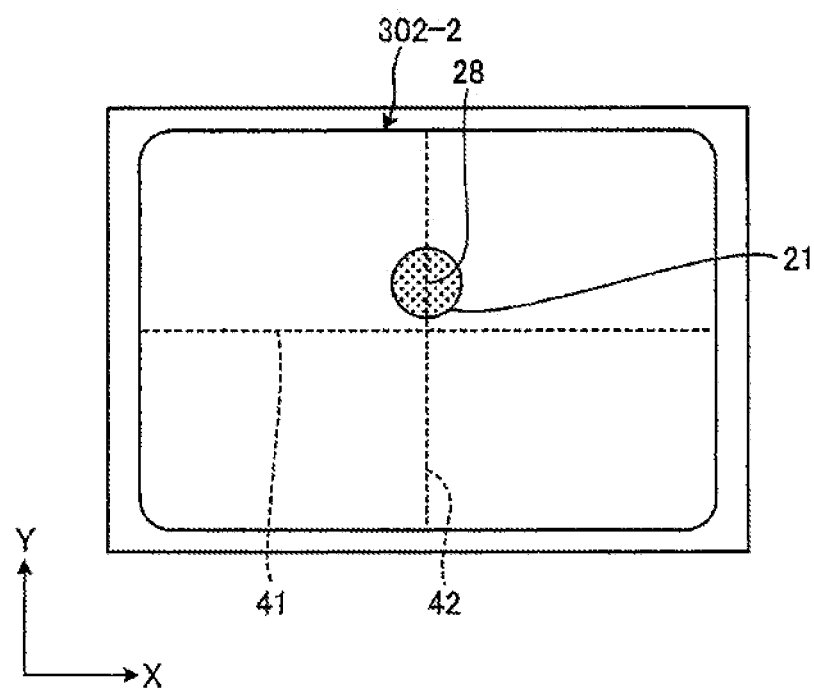
FIG. 10 is a view illustrating another example of an image captured in the second image capturing step of the method of confirming the optical axis of a laser processing apparatus illustrated in FIG. 5.

FIG. 8 schematically illustrates in side elevation, partly in cross section, a second image capturing step of the method of confirming the optical axis of a laser processing apparatus illustrated in FIG. 5. FIG. 9 illustrates an example of an image captured in the second image capturing step of the method of confirming the optical axis of a laser processing apparatus illustrated in FIG. 5. FIG. 10 illustrates another example of an image captured in the second image capturing step of the method of confirming the optical axis of a laser processing apparatus illustrated in FIG. 5.

The second image capturing step ST3 is a step of installing the second mirror 23-2 in position, positioning the image capturing unit 40 in a second position for receiving the laser beam 21 reflected by the third mirror 23-3, and energizing the laser oscillator 22 to emit the laser beam 21 for the image capturing unit 40 to capture an image of the laser beam 21.

In the second image capturing step ST3, the operator installs the second mirror 23-2 in the laser beam applying unit 20 and removes the condensing lens 24 from the laser beam applying unit 20. In the second image capturing step ST3, in response to an operator's action entered through the input unit, the laser processing apparatus 1 adjusts the position of the chuck table 10 in the X-axis directions with the X-axis moving unit 31 to cause the image capturing unit 40 on the holding surface 11 of the chuck table 10 to face the third mirror 23-3 of the laser beam applying unit 20 in the Z-axis directions. In the second image capturing step ST3, therefore, the image capturing unit 40 is positioned in the second position below the third mirror 23-3.

In the second image capturing step ST3, as illustrated in FIG. 8, the laser oscillator 22 emits the laser beam 21 that is reflected successively by the first mirror 23-1 and the second mirror 23-2 and then reflected toward the chuck table 10 by the third mirror 23-3. In the second image capturing step ST3, then, the image capturing unit 40 receives the laser beam 21, acquires a captured image 302-1 illustrated as an example in FIG. 9 or a captured image 302-2 illustrated as another example in FIG. 10 that includes the beam spot of the laser beam 21, and outputs the captured image 302-1 or 302-2 to the control unit 100.

In the second image capturing step ST3, the control unit 100 extracts the position of the laser beam 21 from the captured image 302-1 or 302-2, calculates and stores coordinates of the laser beam 21 in the X-axis directions and the Y-axis directions in the captured image 302-1 or 302-2, and outputs the captured image 302-1 or 302-2 to the display unit 101. Then, control goes to the determining step ST4. The display unit 101 displays the captured image 302-1 or 302-2 input thereto on the display screen 102.

(Determining Step)

The determining step ST4 is a step of determining whether the optical axis 28 of the laser beam 21 reflected by the first mirror 23-1 and the optical axis 28 of the laser beam 21 reflected by the third mirror 23-3 exist in one XZ plane or not on the basis of an amount of a shift between the first reference line 41 parallel to the X-axis directions in the captured images 301, 302-1, and 302-2 and positions of beam spots of the laser beams 21 in the captured image 301 acquired in the first image capturing step ST2 and the captured image 302-1 or 302-2 acquired in the second image capturing step ST3.

According to the first embodiment, in the determining step ST4, the control unit 100 calculates a distance in the Y-axis directions between the position, extracted in the first image capturing step ST2, of the laser beam 21 in the captured image 301 and the position, extracted in the second image capturing step ST3, of the laser beam 21 in the captured image 302-1 or 302-2, on the basis of the coordinate, stored in the first image capturing step ST2, in the Y-axis directions of the laser beam 21 in the captured image 301 and the coordinate, stored in the second image capturing step ST3, in the Y-axis directions of the laser beam 21 in the captured image 302-1 or 302-2.

According to the first embodiment, in the determining step ST4, the control unit 100 determines whether or not the calculated distance is equal to or larger than a predetermined distance. According to the first embodiment, in the determining step ST4, if the control unit 100 determines that the calculated distance is smaller than the predetermined distance, the control unit 100 determines that the optical axis 28 of the laser beam 21 reflected by the first mirror 23-1 and the optical axis 28 of the laser beam 21 reflected by the third mirror 23-3 exist in one XZ plane. Then, the optical axis confirming method comes to an end.

According to the first embodiment, in the determining step ST4, if the control unit 100 determines that the calculated distance is equal to or larger than the predetermined distance, the control unit 100 determines that the optical axis 28 of the laser beam 21 reflected by the first mirror 23-1 and the optical axis 28 of the laser beam 21 reflected by the third mirror 23-3 do not exist in one XZ plane. In the case in which the control unit 100 determines that the optical axis 28 of the laser beam 21 reflected by the first mirror 23-1 and the optical axis 28 of the laser beam 21 reflected by the third mirror 23-3 do not exist in one XZ plane, the adjusting mechanisms 261 of the respective mirror holders 26 that support the second mirror 23-2 and the third mirror 23-3 are adjusted to adjust at least either positions or tilts of the second mirror 23-2 and the third mirror 23-3 so as to position the optical axes 28 in one XZ plane. Then, the optical axis confirming method comes to an end.

In a case in which the captured image 302-1 illustrated in FIG. 9 is acquired in the second image capturing step ST3 according to the first embodiment, since the coordinate in the Y-axis directions of the laser beam 21 in the captured image 301 and the coordinate in the Y-axis directions of the laser beam 21 in the captured image 302-1 agree with each other, the control unit 100 determines that the calculated distance is smaller than the predetermined distance in the determining step ST4. In the case in which the captured image 302-1 illustrated in FIG. 9 is acquired in the second image capturing step ST3, therefore, the control unit 100 determines in the determining step ST4 that the optical axis 28 of the laser beam 21 reflected by the first mirror 23-1 and the optical axis 28 of the laser beam 21 reflected by the third mirror 23-3 exist in one XZ plane.

In a case in which the captured image 302-2 illustrated in FIG. 10 is acquired in the second image capturing step ST3 according to the first embodiment, the control unit 100 determines that the distance in the Y-axis directions between the optical axis 28 of the laser beam 21 in the captured image 301 and the optical axis 28 of the laser beam 21 in the captured image 302-2 is equal to or larger than a predetermined distance in the determining step ST4. In the case in which the captured image 302-2 illustrated in FIG. 10 is acquired in the second image capturing step ST3, therefore, the control unit 100 determines in the determining step ST4 that the optical axis 28 of the laser beam 21 reflected by the first mirror 23-1 and the optical axis 28 of the laser beam 21 reflected by the third mirror 23-3 do not exist in one XZ plane.

As described above, in the method of confirming the optical axis of a laser processing apparatus according to the first embodiment, the image capturing unit 40 is used in the first image capturing step ST2 and the second image capturing step ST3, and the image capturing unit 40 is placed on the holding surface 11 of the chuck table 10 so as to be movable in the X-axis directions in the image capturing unit placing step ST1. Consequently, in the method of confirming the optical axis of a laser processing apparatus according to the first embodiment, the chuck table 10, i.e., the image capturing unit 40, can be moved only in the X-axis directions between the first image capturing step ST2 and the second image capturing step ST3, and the image capturing unit 40 can capture images of the laser beam 21 in the image capturing steps ST2 and ST3 to acquire the captured images 301, 302-1, and 302-2.

Therefore, the method of confirming the optical axis of a laser processing apparatus according to the first embodiment can grasp the coordinates in the Y-axis directions of the laser beams 21 in the captured images 301, 302-1, and 302-2 captured and acquired in the first image capturing step ST2 and the second image capturing step ST3, and can quantitatively assess whether the laser beams 21 exist in one XZ plane parallel to the X-axis directions representing a processing-in-progress direction or not. As a result, the method of confirming the optical axis of a laser processing apparatus according to the first embodiment is advantageous in that it is able to quantitatively assess whether the optical axes 28 of the laser beams 21 reflected along the vertical direction by the mirrors 23-1 and 23-3 exist in one XZ plane parallel to the X-axis directions or not.

Second Embodiment

Figure 11:
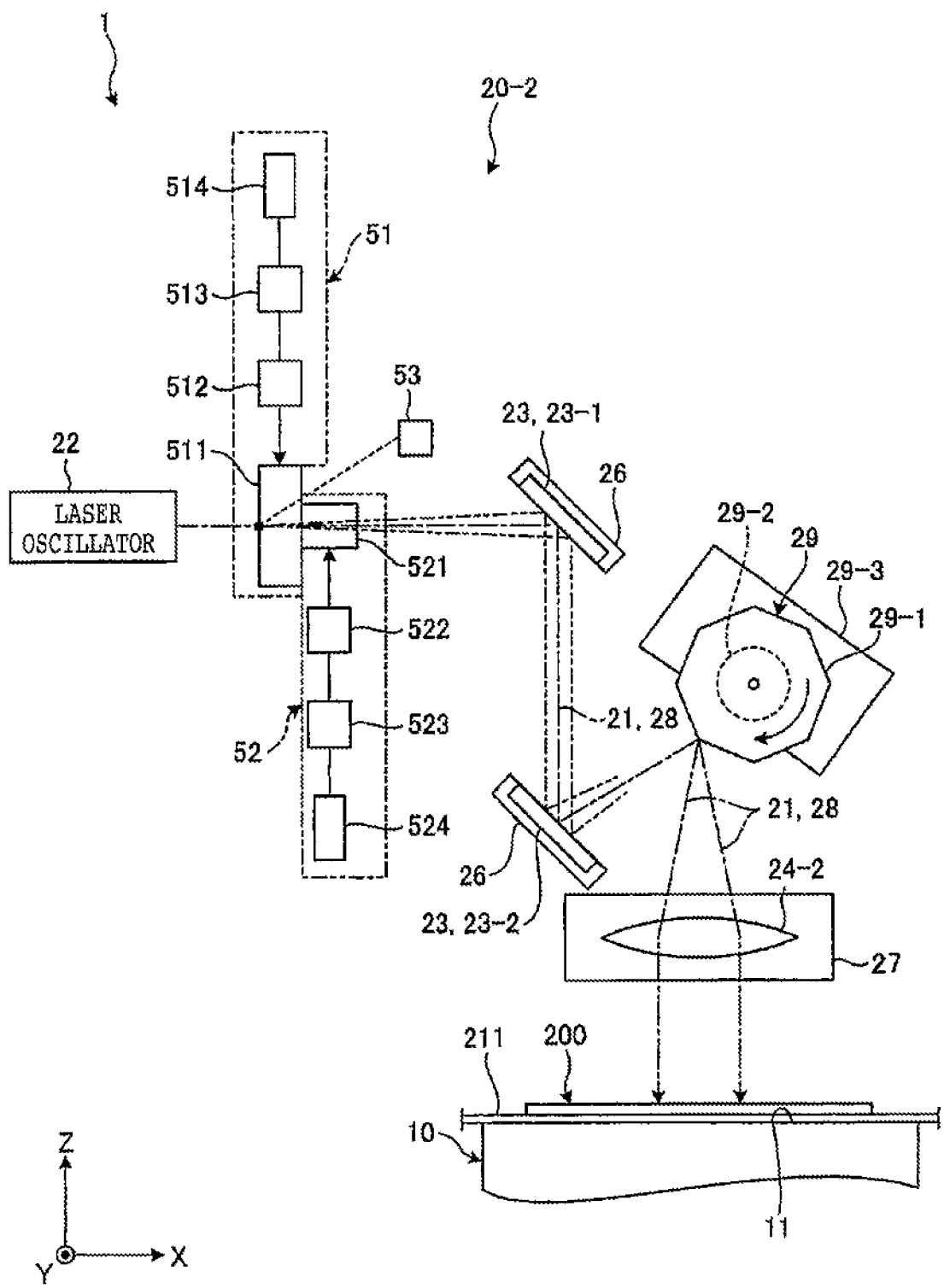
FIG. 11 is a schematic view of a configuration of a laser beam applying unit of a laser processing apparatus that carries out a method of confirming an optical axis of a laser processing apparatus according to a second embodiment of the present invention.
Figure 12:
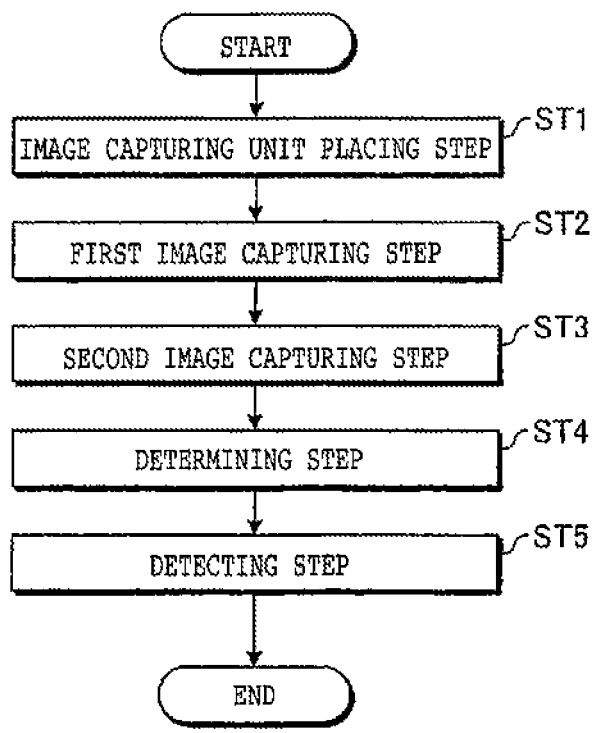
FIG. 12 is a flowchart of a sequence of the method of confirming the optical axis of a laser processing apparatus according to the second embodiment.
Figure 13:
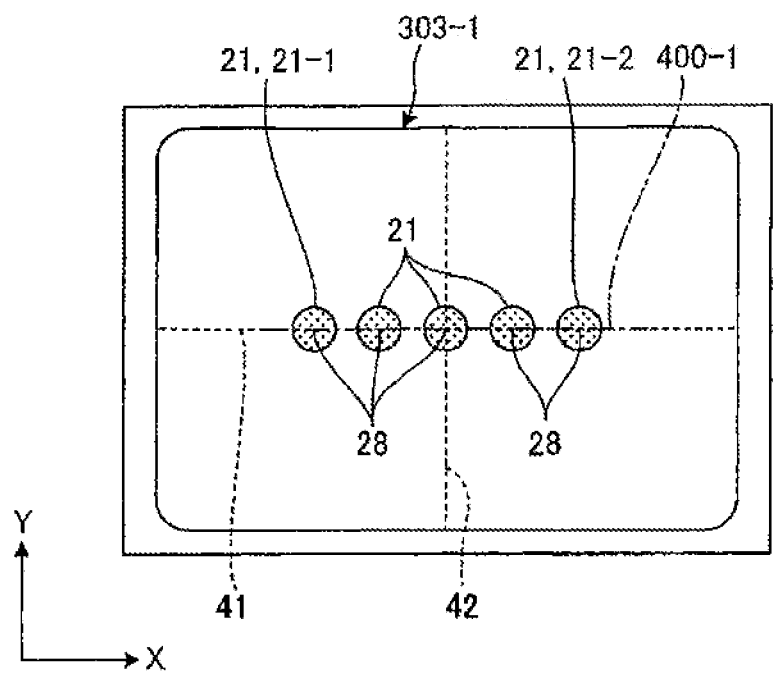
FIG. 13 is a view illustrating an example of an image captured in a detecting step of the method of confirming the optical axis of a laser processing apparatus illustrated in FIG. 12.
Figure 14:
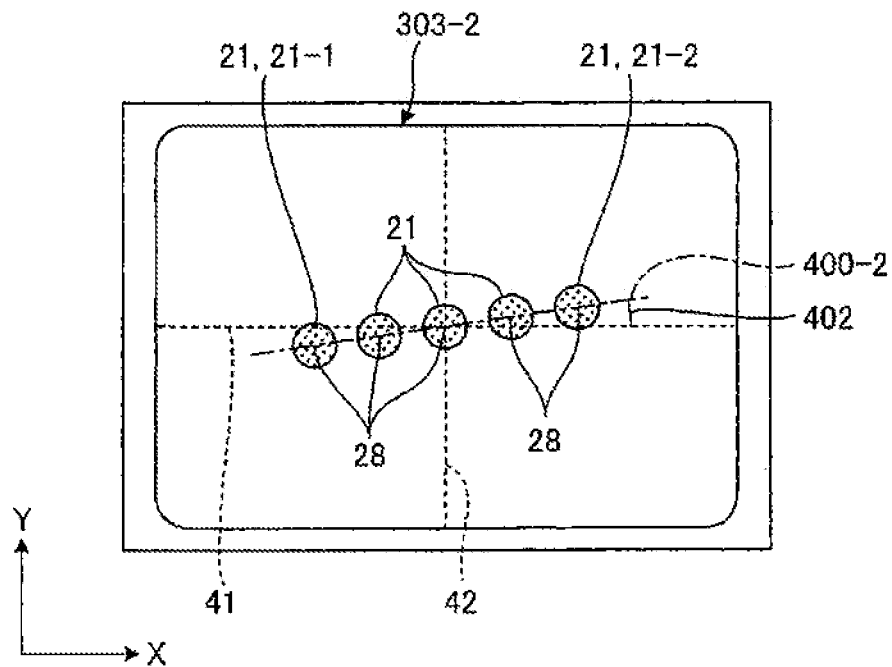
FIG. 14 is a view illustrating another example of an image captured in the detecting step of the method of confirming the optical axis of a laser processing apparatus illustrated in FIG. 12.

A method of confirming the optical axis of a laser processing apparatus according to a second embodiment of the present invention will be described below with reference to the drawings. FIG. 11 schematically illustrates a configuration of a laser beam applying unit of a laser processing apparatus that carries out a method of confirming the optical axis of a laser processing apparatus according to a second embodiment of the present invention. FIG. 12 is a flowchart of a sequence of the method of confirming the optical axis of a laser processing apparatus according to the second embodiment. FIG. 13 illustrates an example of an image captured in a detecting step of the method of confirming the optical axis of a laser processing apparatus illustrated in FIG. 12. FIG. 14 illustrates another example of an image captured in the detecting step of the method of confirming the optical axis of a laser processing apparatus illustrated in FIG. 12. Those parts illustrated in FIGS. 11, 12, 13, and 14 which are identical to those according to the first embodiment are denoted by identical reference symbols, and their description will be omitted below.

The method of confirming the optical axis of a laser processing apparatus (hereinafter also referred to as "optical axis confirming method") according to the second embodiment is carried out by the laser processing apparatus, denoted by 1, illustrated in FIG. 11. The laser processing apparatus 1 illustrated in FIG. 11 is similar to the laser processing apparatus 1 according to the first embodiment except that, as illustrated in FIG. 11, a laser beam applying unit 20-2 includes a polygon scanner 29 as a third optical device instead of the third mirror 23-3, a condensing lens 24-2 in the form of a telecentric fθ lens, first acoustooptical deflecting means 51, second acoustooptical deflecting means 52, and laser beam absorbing means 53.

The condensing lens 24-2 of the laser beam applying unit 20-2 of the laser processing apparatus 1 according to the second embodiment applies the laser beam 21 reflected by and entered from a polygon mirror 29-1 of the polygon scanner 29 along the Z-axis directions to the workpiece 200 held on the chuck table 10.

The polygon scanner 29 includes the polygon mirror 29-1 and a scanning motor 29-2 for rotating the polygon mirror 29-1 about its central axis along the Y-axis directions. The polygon scanner 29 is held by a mirror holder 29-3 including an adjusting mechanism, not illustrated, capable of adjusting at least one of a position of the polygon mirror 29-1 and a tilt of the central axis of the polygon mirror 29-1. The polygon mirror 29-1 of the polygon scanner 29 reflects the laser beam 21 whose traveling direction has been changed by the second mirror 23-2 toward the condensing lens 24-2 again into a direction parallel to the XZ plane, and the scanning motor 29-2 rotates the polygon mirror 29-1 about its own central axis, thereby scanning the laser beam 21 in the X-axis directions. The scanning motor 29-2 is controlled by the control unit 100.

The first acoustooptical deflecting means 51 includes a first acoustooptical device 511 for changing the direction of the optical axis 28 of the laser beam 21 to the X-axis directions in coaction with the polygon scanner 29, a first radio frequency (RF) oscillator 512 for generating an RF signal to be applied to the first acoustooptical device 511, a first RF amplifier 513 for amplifying power of the RF signal generated by the first RF oscillator 512 and applying the RF signal with the amplified power to the first acoustooptical device 511, and first deflection angle adjusting means 514 for adjusting a frequency of the RF signal generated by the first RF oscillator 512. The first acoustooptical device 511 adjusts an angle by which to change the direction of the optical axis 28 of the laser beam 21, depending on the frequency of the RF signal applied thereto. The first deflection angle adjusting means 514 is controlled by the control unit 100.

The second acoustooptical deflecting means 52 includes a second acoustooptical device 521 for changing the direction of the optical axis 28 of the laser beam 21 to the Y-axis directions perpendicular to the X-axis directions, a second RF oscillator 522 for generating an RF signal to be applied to the second acoustooptical device 521, a second RF amplifier 523 for amplifying power of the RF signal generated by the second RF oscillator 522 and applying the RF signal with the amplified power to the second acoustooptical device 521, and second deflection angle adjusting means 524 for adjusting a frequency of the RF signal generated by the second RF oscillator 522. The second acoustooptical device 521 adjusts an angle by which to change the direction of the optical axis 28 of the laser beam 21, depending on the frequency of the RF signal applied thereto. The second deflection angle adjusting means 524 is controlled by the control unit 100.

The laser beam absorbing means 53 operates to absorb the laser beam 21 whose direction has been changed by the first acoustooptical device 511 as indicated by a broken line in FIG. 11 in a case in which an RF signal having a predetermined frequency is not applied to the first acoustooptical device 511.

The laser beam applying unit 20-2 of the laser processing apparatus 1 according to the second embodiment is able to swing the optical axis 28 of the laser beam 21 to apply the laser beam 21 to the workpiece 200 held on the chuck table 10 due to a composite action of the first acoustooptical deflecting means 51 and the second acoustooptical deflecting means 52 to change the direction of the optical axis 28 and the polygon scanner 29 to change the direction of the optical axis 28. In a case in which a laser beam 21 having a wavelength absorbable by the workpiece 200 is applied to the workpiece 200, the laser beam applying unit 20-2 of the laser processing apparatus 1 according to the second embodiment is able to form a laser-processed groove having a desired width in the workpiece 200.

As illustrated in FIG. 12, the optical axis confirming method according to the second embodiment includes the image capturing unit placing step ST1, the first image capturing step ST2, the second image capturing step ST3, the determining step ST4, and a detecting step ST5. The optical axis confirming method according to the second embodiment is similar to the optical axis confirming method according to the first embodiment except that the second image capturing step ST3 is different and the detecting step ST5 is further included.

In the second image capturing step ST3 of the optical axis confirming method according to the second embodiment, the operator installs the second mirror 23-2 in the laser beam applying unit 20-2, removes the condensing lens 24-2, and removes the polygon scanner 29. According to the second embodiment, in the second image capturing step ST3, a dummy mirror, not illustrated, that is structurally identical to the third mirror 23-3 is installed in a position where the polygon scanner 29 was installed. At this time, the position and a tilt of the dummy mirror are adjusted such that the optical axis 28 of the laser beam 21 reflected by the dummy mirror will be parallel to the Z-axis directions.

According to the second embodiment, in the second image capturing step ST3, in response to an operator's action entered through the input unit, the laser processing apparatus 1 adjusts the position of the chuck table 10 in the X-axis directions with the X-axis moving unit 31 to cause the image capturing unit 40 on the holding surface 11 of the chuck table 10 to face the dummy mirror in the Z-axis directions. In the second image capturing step ST3, therefore, the image capturing unit 40 is positioned in the second position below the dummy mirror. According to the second embodiment, in the second image capturing step ST3, as with the first embodiment, the laser oscillator 22 emits the laser beam 21, and the image capturing unit 40 acquires a captured image 303-1 illustrated as an example in FIG. 13 or a captured image 303-2 illustrated as another example in FIG. 14 that includes the beam spot of the laser beam 21.

The detecting step ST5 of the optical axis confirming method according to the second embodiment is a step of detecting the tilt of the polygon mirror 29-1 on the basis of whether a straight line 400-1 or 400-2 interconnecting the position of the laser beam 21 at the time of starting to scan in the captured image 303-1 or 303-2 illustrated in FIG. 13 or 14 and the position of the laser beam 21 at the time of ending to scan in the captured image 303-1 or 303-2 is parallel to the first reference line 41 in the captured image 303-1 or 303-2 or not.

In the detecting step ST5, the operator removes the dummy mirror from the laser beam applying unit 20-2, and installs the polygon scanner 29 and the condensing lens 24-2 in the laser beam applying unit 20-2. At this time, the image capturing unit 40 is positioned in the second position below the condensing lens 24-2. In the detecting step ST5, the laser oscillator 22 emits the laser beam 21, and while the first and second RF oscillators 512 and 522 of the first and second acoustooptical deflecting means 51 and 52 are stopping scanning the laser beam 21, the laser beam 21 emitted from the laser oscillator 22 is reflected successively by the first mirror 23-1 and the second mirror 23-2 and then reflected toward the image capturing unit 40 on the chuck table 10 through the condensing lens 24-2 by the polygon mirror 29-1 while at the same time the laser beam 21 is being scanned in the X-axis directions by the polygon mirror 29-1 rotated about its central axis by the scanning motor 29-2.

In the detecting step ST5, the image capturing unit 40 receives the laser beam 21, acquires the captured image 303-1 illustrated as an example in FIG. 13 or the captured image 303-2 illustrated as another example in FIG. 14 that includes the beam spot of the laser beam 21, and outputs the captured image 303-1 or 303-2 to the control unit 100. In the detecting step ST5, the control unit 100 extracts the laser beam 21 (hereinafter denoted by "21-1") at the time of starting to scan and the laser beam 21 (hereinafter denoted by "21-2") at the time of ending to scan from the captured image 303-1 or 303-2, calculates and stores coordinates of the laser beams 21-1 and 21-2 in the X-axis directions and the Y-axis directions in the captured image 303-1 or 303-2, and outputs the captured image 303-1 or 303-2 to the display unit 101. The display unit 101 displays the captured image 303-1 or 303-2 input thereto on the display screen 102.

In the detecting step ST5, the control unit 100 generates the straight line 400-1 or 400-2 interconnecting the laser beams 21-1 and 21-2, and calculates an angle 402, illustrated in FIG. 14 only, between the straight line 400-1 or 400-2 and the first reference line 41. According to the second embodiment, in the detecting step ST5, the control unit 100 determines whether or not the calculated angle 402 is equal to or larger than a predetermined angle.

According to the second embodiment, in the detecting step ST5, the captured image 303-2 illustrated in FIG. 14 is acquired, and if the control unit 100 determines that the calculated angle 402 is equal to or larger than the predetermined angle, the control unit 100 determines that an orientation of the central axis of the polygon mirror 29-1 intersects with the Y-axis directions. In this case, the adjusting mechanism of the mirror holder 29-3 is adjusted to make the orientation of the central axis of the polygon mirror 29-1 parallel to the Y-axis directions. Then, the optical axis confirming method comes to an end.

In a case in which the captured image 303-1 illustrated in FIG. 13 is acquired in the detecting step ST5, the laser beams 21, 21-1, and 21-2 in the captured image 303-1 are positioned on the first reference line 41. In this case, the control unit 100 determines that the calculated angle 402 is smaller than the predetermined angle and determines that the orientation of the central axis of the polygon mirror 29-1 is parallel to the Y-axis directions. Then, the optical axis confirming method comes to an end.

In the method of confirming the optical axis of a laser processing apparatus according to the second embodiment, the image capturing unit 40 is used in the first image capturing step ST2 and the second image capturing step ST3, and the image capturing unit 40 is placed on the holding surface 11 of the chuck table 10 so as to be movable in the X-axis directions in the image capturing unit placing step ST1. Consequently, in the method of confirming the optical axis of a laser processing apparatus according to the second embodiment, the chuck table 10, i.e., the image capturing unit 40, can be moved only in the X-axis directions between the first image capturing step ST2 and the second image capturing step ST3, and the image capturing unit 40 can capture images of the laser beam 21 in the image capturing steps ST2 and ST3 to acquire the captured image 301, 302-1, or 302-2.

As a result, the method of confirming the optical axis of a laser processing apparatus according to the second embodiment is advantageous in that it can grasp the coordinates in the Y-axis directions of the laser beams 21 in the captured image 301, 302-1, or 302-2 captured and acquired in the first image capturing step ST2 and the second image capturing step ST3, and can quantitatively assess whether the optical axes 28 of the laser beams 21 reflected along the vertical directions from the first mirror 23-1 and the dummy mirror exist on one XZ plane parallel to the X-axis directions or not.

Furthermore, the method of confirming the optical axis of a laser processing apparatus according to the second embodiment is advantageous in that it can detect the tilt of the central axis of the polygon mirror 29-1 as it includes the detecting step ST5.

[Modifications]

Figure 15:
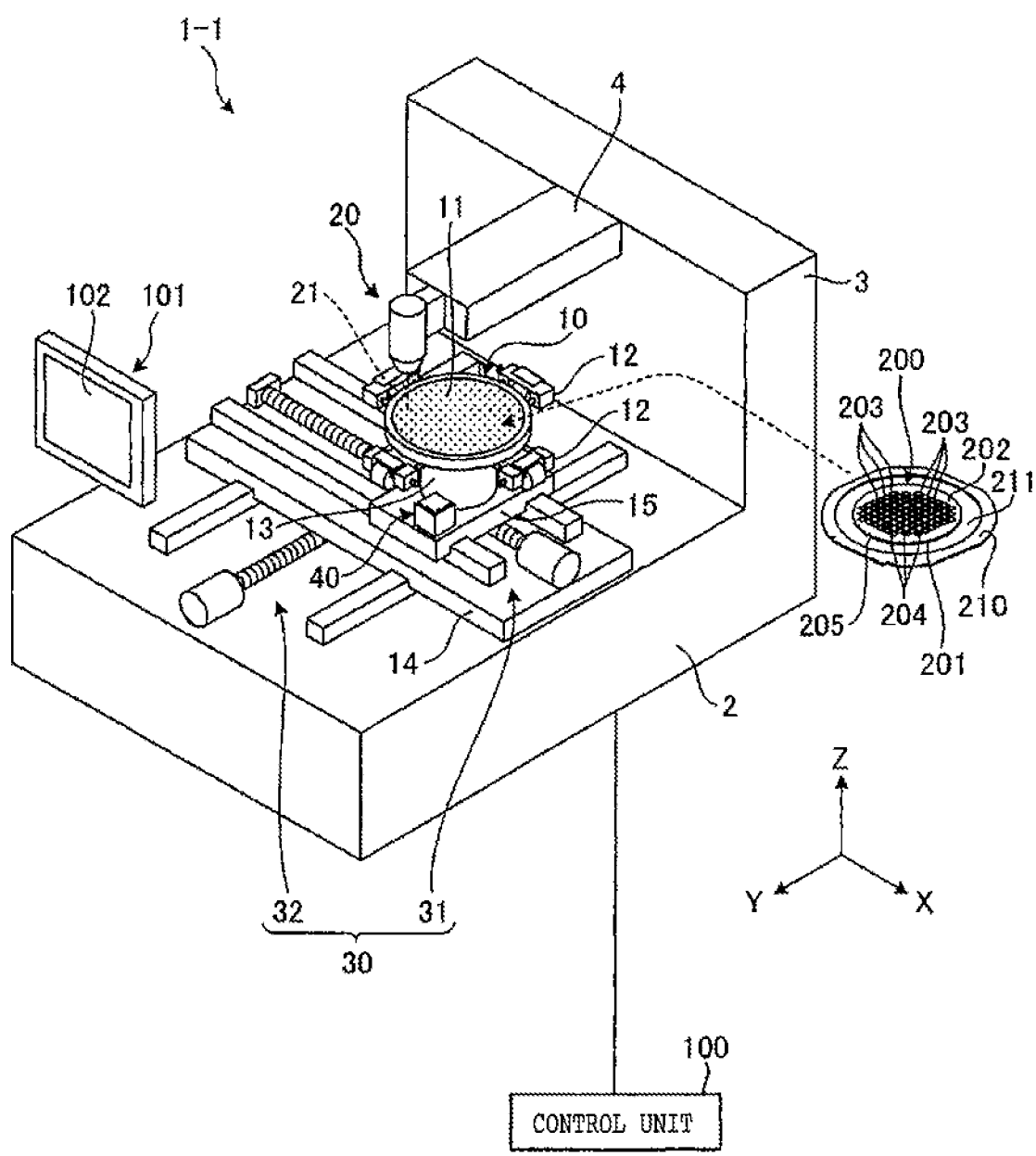
FIG. 15 is a perspective view illustrating a structural example of a laser processing apparatus that carries out a method of confirming an optical axis of a laser processing apparatus according to a first modification of the first and second embodiments.
Figure 16:
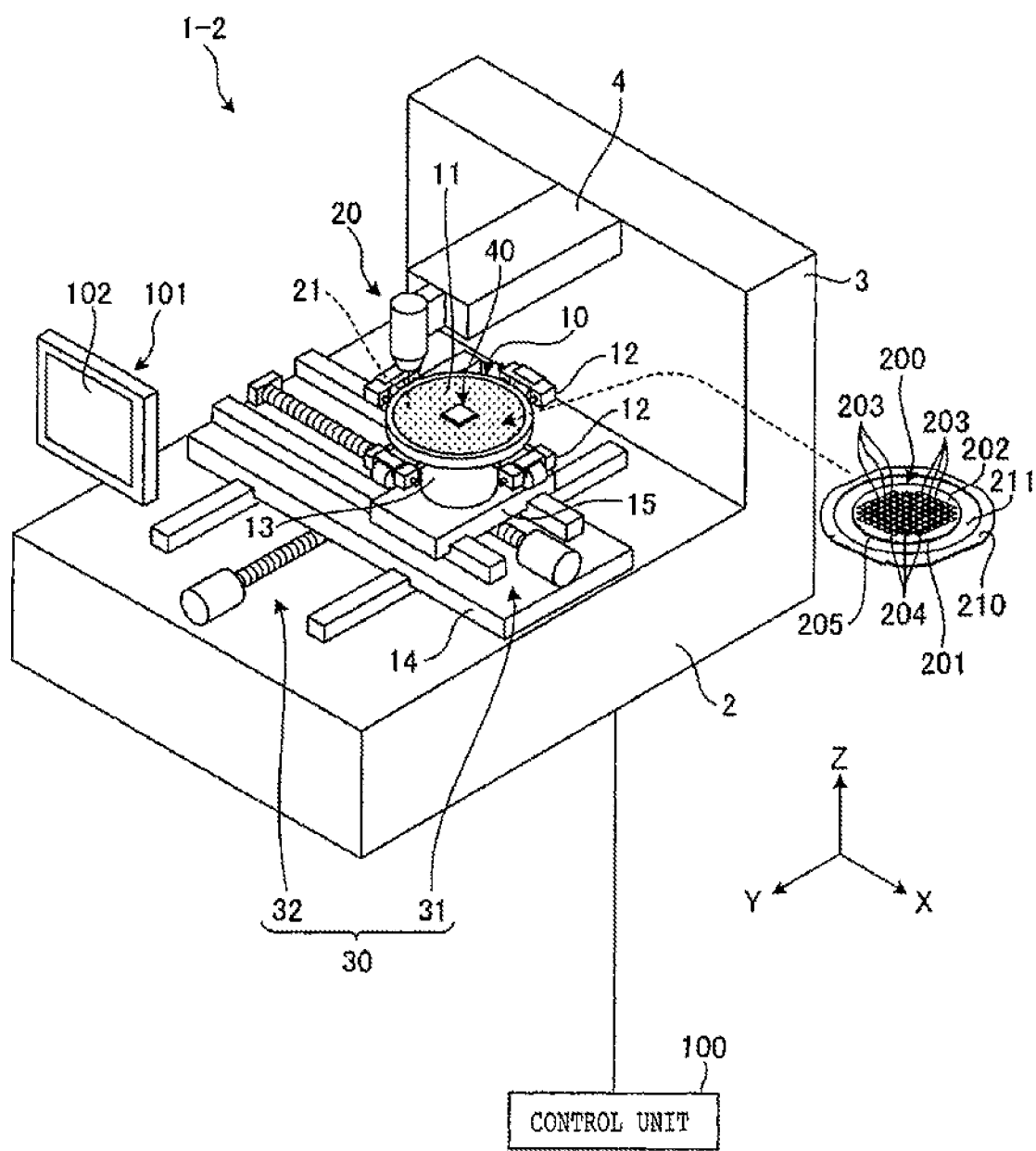
FIG. 16 is a perspective view illustrating a structural example of a laser processing apparatus that carries out a method of confirming an optical axis of a laser processing apparatus according to a second modification of the first and second embodiments.

Methods of confirming the optical axis of a laser processing apparatus according to modifications of the first embodiment and the second embodiment of the present invention will be described below with reference to the drawings. FIG. 15 illustrates in perspective a structural example of a laser processing apparatus that carries out a method of confirming an optical axis of a laser processing apparatus according to a first modification of the first and second embodiments. FIG. 16 illustrates in perspective a structural example of a laser processing apparatus that carries out a method of confirming an optical axis of a laser processing apparatus according to a second modification of the first and second embodiments. Those parts illustrated in FIGS. 15 and 16 which are identical to those according to the first embodiment are denoted by identical reference symbols, and their description will be omitted below.

The method of confirming the optical axis of a laser processing apparatus according to the first modification is similar to the method according to the first embodiment except that, as illustrated in FIG. 15, the image capturing unit 40 is placed in a predetermined position on the second moving plate 15 of a laser processing apparatus 1-1, the image capturing unit placing step ST1 is not carried out, and the laser beam applying unit 20 is disposed opposite the image capturing unit 40 on the second moving plate 15 in the Z-axis directions in the image capturing steps ST2 and ST3 and the detecting step ST5.

The method of confirming the optical axis of a laser processing apparatus according to the second modification is similar to the method according to the first embodiment except that, as illustrated in FIG. 16, the image capturing unit 40 is placed in the holding surface 11 of the chuck table 10 of a laser processing apparatus 1-2, the image capturing unit placing step ST1 is not carried out, and the laser beam applying unit 20 is disposed opposite the image capturing unit 40 in the holding surface 11 in the Z-axis directions in the image capturing steps ST2 and ST3 and the detecting step ST5. According to the second modification, it is desirable that an upper surface of the image capturing unit 40 lie flush with or be disposed beneath the holding surface 11.

In the methods of confirming the optical axis of a laser processing apparatus according to the first and second modifications, the image capturing unit 40 is used in the first image capturing step ST2 and the second image capturing step ST3, and the image capturing unit 40 is placed on the holding surface 11 of the chuck table 10 so as to be movable in the X-axis directions in the image capturing unit placing step ST1. As a result, the methods of confirming the optical axis of a laser processing apparatus according to the first and second modifications are advantageous in that, as with the methods according to the first and second embodiments, it is able to quantitatively assess whether the optical axes 28 of the laser beams 21 reflected along the vertical direction by the mirrors 23-1 and 23-3 and the dummy mirror or the polygon mirror 29-1 exist in one XZ plane parallel to the X-axis directions or not.

The present invention is not limited to above embodiments and modifications, but various changes and modifications may be made therein without departing from the scope of the invention. According to the present invention, for optical axis adjustment, the adjusting mechanisms 261 of the mirror holders 26 that hold the mirrors 23-2 and 23-3 and the dummy mirror may be adjusted by electric motors to adjust at least either the positions or tilts of the mirrors. Furthermore, the method of confirming the optical axis of a laser processing apparatus according to the present invention may quantitatively assess whether the optical axes 28 of laser beams 21 reflected along vertical directions from three or more optical devices exist on one XZ plane parallel to the X-axis directions.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method of confirming an optical axis of a laser processing apparatus, the laser processing apparatus including
a chuck table for holding a workpiece thereon,
a laser beam applying unit for processing the workpiece held on the chuck table by applying a laser beam thereto, and
a moving assembly for moving the chuck table and the laser beam applying unit relatively to each other in X-axis directions and Y-axis directions perpendicular to the X-axis directions,
the laser beam applying unit including
a first optical device having a line of intersection with an XZ plane perpendicular to an XY plane lying parallel to the X-axis directions and the Y-axis directions, for reflecting the laser beam into a direction parallel to the XZ plane,
a laser oscillator disposed for emitting the laser beam so as to intersect with the line of intersection,
a second optical device for reflecting the laser beam reflected by the first optical device to change a traveling direction of the laser beam within the XZ plane, and
a third optical device for reflecting the laser beam whose traveling direction has been changed by the second optical device into a direction parallel to the XZ plane,
the method comprising:
an image capturing unit placing step including placing an image capturing unit for capturing an image of the laser beam on the chuck table so that the image capturing unit is movable in the X-axis directions;
a first image capturing step including removing the second optical device from the laser beam applying unit, positioning the image capturing unit in a first position for receiving the laser beam reflected by the first optical device, and capturing an image of a first laser beam spot emitted from the laser oscillator with the image capturing unit;
a second image capturing step including installing the second optical device back to the laser beam applying unit, positioning the image capturing unit in a second position for receiving the laser beam reflected by the third optical device, and capturing an image of a second laser beam spot emitted from the laser oscillator with the image capturing unit; and
a determining step including determining whether an optical axis of the laser beam reflected by the first optical device and an optical axis of the laser beam reflected by the third optical device exist in one XZ plane or not on a basis of an amount of a shift between a reference line parallel to the X-axis directions in the captured images and positions of the laser beam spots in the images captured in the first image capturing step and the second image capturing step by comparing the shift amount and predetermined amount with a controller.

2. The method of confirming the optical axis of the laser processing apparatus according to claim 1, wherein
when the optical axis of the laser beam reflected by the first optical device and the optical axis of the laser beam reflected by the third optical device do not exist in one XZ plane, as determined in the determining step, adjusting at least either positions or tilts of the second optical device and the third optical device so as to position the optical axis of the laser beam reflected by the first optical device and the optical axis of the laser beam reflected by the third optical device in one XZ plane.

3. The method of confirming the optical axis of the laser processing apparatus according to claim 1, wherein the third optical device includes a polygon mirror.

4. The method of confirming the optical axis of the laser processing apparatus according to claim 3, further comprising:
a detecting step including capturing images of laser beam positions at a predetermined time by the image capturing unit; and detecting a tilt of the polygon mirror on a basis of whether a straight line formed by the positions of the laser beam in the images captured by the image capturing unit is parallel to the reference line in the captured images.

* * * * *